United States Patent
Avinash

(10) Patent No.: US 7,623,723 B2
(45) Date of Patent: Nov. 24, 2009

(54) METHOD FOR RANDOM POINT AND PATTERNED NOISE REDUCTION IN DIGITAL IMAGES

(75) Inventor: Gopal B. Avinash, New Berlin, WI (US)

(73) Assignee: GE Medical Systems Global Technology Com., Waukesha, WI (US)

( * ) Notice: Subject to any disclaimer, the term of this patent is extended or adjusted under 35 U.S.C. 154(b) by 1094 days.

(21) Appl. No.: 10/723,736

(22) Filed: Nov. 26, 2003

(65) Prior Publication Data

US 2005/0111751 A1 May 26, 2005

(51) Int. Cl.
*G06K 9/40* (2006.01)
(52) U.S. Cl. .................. 382/254; 380/260; 380/261; 380/262
(58) Field of Classification Search .............. 382/254, 382/260, 261, 262
See application file for complete search history.

(56) References Cited

U.S. PATENT DOCUMENTS

| | | | | |
|---|---|---|---|---|
| 5,673,332 A | * | 9/1997 | Nishikawa et al. | 382/128 |
| 6,009,140 A | * | 12/1999 | Hsieh | 378/4 |
| 6,094,511 A | * | 7/2000 | Metcalfe et al. | 382/260 |
| 6,208,763 B1 | * | 3/2001 | Avinash | 382/254 |
| 6,292,583 B1 | * | 9/2001 | Maruo | 382/149 |
| 6,535,623 B1 | * | 3/2003 | Tannenbaum et al. | 382/128 |
| 6,563,513 B1 | * | 5/2003 | Yu et al. | 345/698 |
| 6,690,840 B1 | * | 2/2004 | Janko et al. | 382/294 |
| 7,113,306 B1 | * | 9/2006 | Nakabayashi et al. | 358/1.9 |
| 7,171,057 B1 | * | 1/2007 | Wilensky et al. | 382/284 |
| 7,215,365 B2 | * | 5/2007 | Cooper | 348/223.1 |
| 2002/0005857 A1 | * | 1/2002 | Kasahara et al. | 345/611 |
| 2003/0099405 A1 | * | 5/2003 | Avinash et al. | 382/260 |
| 2003/0128374 A1 | * | 7/2003 | Brothers et al. | 358/1.2 |
| 2003/0199762 A1 | * | 10/2003 | Fritz et al. | 600/437 |
| 2004/0161139 A1 | * | 8/2004 | Samara et al. | 382/131 |

* cited by examiner

*Primary Examiner*—John B Strege
(74) *Attorney, Agent, or Firm*—Fletcher Yoder

(57) ABSTRACT

A technique is provided for filtering noise in digital image data, particularly random point or spike noise. Image data may be rank order filtered and absolute differences between ordered values computed to create a mask. Blending is performed based upon a likelihood that individual pixels are or exhibit spike noise. The rank order filtered values may be used directly for blending, or the original image may be shrunk and then expanded to provide a rapid and computationally efficient spike noise reduction alternative.

26 Claims, 4 Drawing Sheets

METHOD FOR RANDOM POINT AND PATTERNED NOISE REDUCTION IN DIGITAL IMAGES

BACKGROUND OF THE INVENTION

The present invention relates generally to digital imaging and digital image enhancement techniques. More particularly, the invention relates to a novel technique for characterizing noise in a digital image and for compensating for or reducing noise in a processed image.

Many techniques are known and are presently in use for generating digital image data. Such techniques range from simple charge coupled device apparatus, such as digital cameras, to much more complex imaging systems, such as those used for part inspection and medical diagnostics purposes. In all of these systems, a matrix of discrete picture elements or pixels is made up of individual values over a range of intensities. The matrix may also include colors, typically a combination of three base colors. The raw image data acquired by the imaging system may be processed to clarify the image, enhance image features, or otherwise improve the image quality from various points of view. In general, the goal of image enhancement and quality improvement is to provide more useful images, typically more clear or in some way satisfying images for the user.

By way of example, in the medical imaging context, a number of imaging modalities are employed. The modalities are typically based on vastly different imaging physics, and include magnetic resonance imaging (MRI) systems, computed tomography (CT) imaging systems, ultrasound imaging systems, X-ray imaging systems, positron emission tomography (PET) systems, electron beam imaging systems, tomosynthesis systems, and so forth. A scanner or other image acquisition system typically acquires raw image data which is then processed to form a useful set of data for image reconstruction and viewing. The systems typically include on-board processing capabilities for certain processing, while other processing may be performed in subsequent steps, generally referred to as post-processing. In all cases, image enhancement may be an ultimate goal, with raw, partially processed or enhanced image data being stored for later retrieval, reconstruction, transmission, and so forth.

Acquired image data from all types of imaging systems typically contain noise. Noise may result from a wide variety of sources, typically from the various components used to acquire the image data, but may also be a function of the physics of the system, the nature of the subject being imaged, and so forth. Typical image noise may be a mixture of random point noise, which may also be referred to as spike noise, and patterned noise. Modalities such as X-ray imaging and optical imaging, where image data is directly acquired exhibit such noise in a readily visible manner. However, imaging methods requiring reconstruction, such as MRI, CT, ultrasound, and so forth, convert point or spike noise into splotches or small streaks and thereafter the point noise is usually hidden with the patterned noise. In either of these cases, it is desirable that the point noise and patterned noise be detected and appropriately mitigated.

To eliminate spike noise, one class of existing methods uses median filtering or adaptive variation. Another class of methods uses temporal averaging. Methods designed to mitigate patterned noise do not adequately mitigate point noise, however, without blurring or decreasing the contrast of the useful information in the processed image.

There is a need therefore, for an improved technique for reducing both random noise points (spike noise) and patterned noise in the same image. There is a particular need for a technique which is easily implemented, computationally efficient, and which offers options for image enhancement and for time optimization.

BRIEF DESCRIPTION OF THE INVENTION

The present invention provides a technique for reducing spike noise in digitized images that is designed to respond to such needs. The technique may be used in a wide variety of imaging systems. It is not limited to any particular context, application or modality. Accordingly, the technique may be used in any setting, including part inspections, baggage or parcel handling, medical imaging, and so forth. The technique is particularly well-suited to applications where spike noise becomes particularly problematic, such as MRI, CT, ultrasound and similar imaging systems. In general, the technique relies upon characterization of spike noise through processing of input image data. Once the spike noise is characterized, blending of filtered image data is performed taking into account the characterization of certain detected noise as spike noise. Several options are available for the spike noise dependent blending. The characterization and blending may rely, for example, on rank-order filtering of the input image data. Alternatively, spike noise may be characterized and at least partially removed by shrinking and expanding the input image data for combination with filtered image data in a blending step. Other aspects of the technique will be better understood through reading of the description provided below.

The invention contemplates methods, systems and computer programs designed to implement such techniques.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
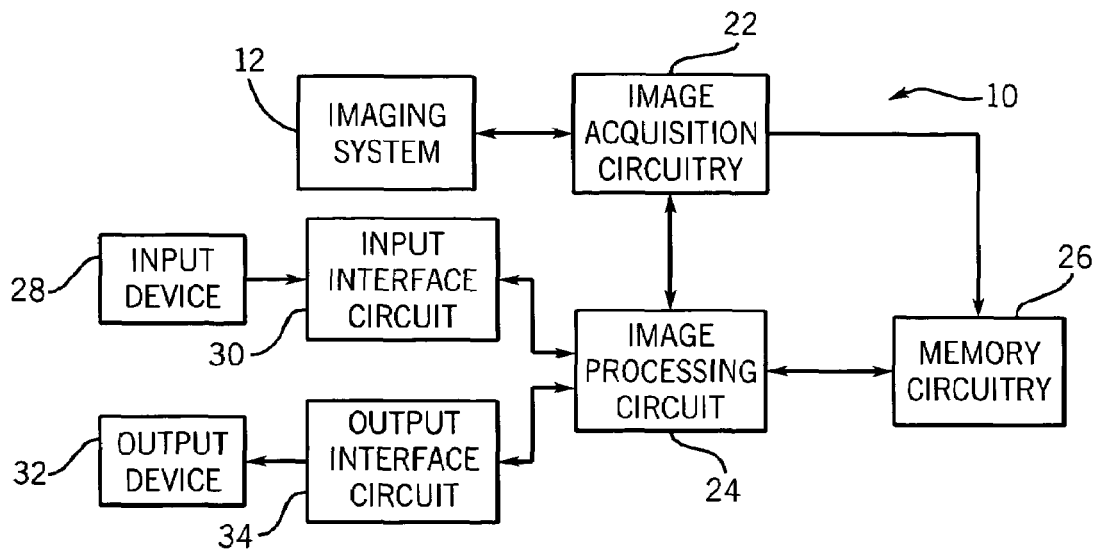
FIG. 1 is a diagrammatical representation of an exemplary imaging system adapted to provide spike noise reduction in accordance with the present techniques.

Referring to FIG. 1, an imaging system 10 is depicted as including a scanner or data acquisition system 12 coupled to circuitry for acquiring and processing discrete pixel data. Signals sensed by the system 12 are encoded to provide digital values representative of the signals associated with specific locations on or in the subject, and are transmitted to the image acquisition circuitry 22. The image acquisition circuitry 22 also provides control signals for configuration and coordination of system operation during image acquisition. The image acquisition circuitry 22 transmits the encoded image signals to an image processing circuit 24. The image processing circuit 24 executes pre-established control logic routines stored within a memory circuit 26 to filter and condition the signals received from the image acquisition circuitry 22 to provide digital values representative of each pixel in the acquired image. These values are then stored in the memory circuit 26 for subsequent processing and display. Alternately, the image acquisition circuitry 22 may transmit the encoded image signals to the memory circuit 26. The image processing circuit 24 may subsequently acquire the signals from the memory circuit 26 for the filtering and conditioning steps described below.

The image processing circuit 24 receives configuration and control commands from an input device 28 via an input interface circuit 30. The input device 28 will typically include an operator's station, keyboard and other input devices for selectively inputting configuration parameters and for commanding specific image acquisition sequences. The image processing circuit 24 is also coupled to an output device 32 via an output interface circuit 34. The output device 32 will typically include a monitor or printer for viewing and producing reconstructed images based upon the image enhancement processing carried out by the processing circuit 24.

In the embodiment described, the image processing circuit 24, the memory circuit 26, and the input and output interface circuits 30 and 34 are included in a programmed digital computer. However, circuitry for carrying out the techniques described herein may be configured as appropriate coding in application-specific microprocessors, analog circuitry, or a combination of digital and analog circuitry.

It should be noted that imaging system 12 may include any suitable type of imaging system or modality. For example, in a medical diagnostics imaging context, industrial contexts, parcel and baggage inspection and handling contexts, the system may include a CT imaging station. Similarly, the system may include an MRI system, an X-ray system, or any other suitable modality. Other modalities presently contemplated may include tomosynthesis systems, positron emission tomography systems, electron beam systems, ultrasound systems, among others. As summarized below, all of the various systems will produce digital data which can be filtered and enhanced in accordance with the present techniques. It should also be noted that, while references made hereinto processing within the imaging system, many of the techniques described herein can and will be applied in post-processing steps. That is, the processing may be carried out in real time or in near real time with image acquisition, or after acquisition and storage of image data. Thus, the image filtering and enhancement techniques described herein may be carried out remotely from the imaging system, as on completely separate and independent workstations that access the image data, either raw, processed or partially processed and perform the steps and functions described herein to improve the ultimate reconstructed image.

Figure 2:
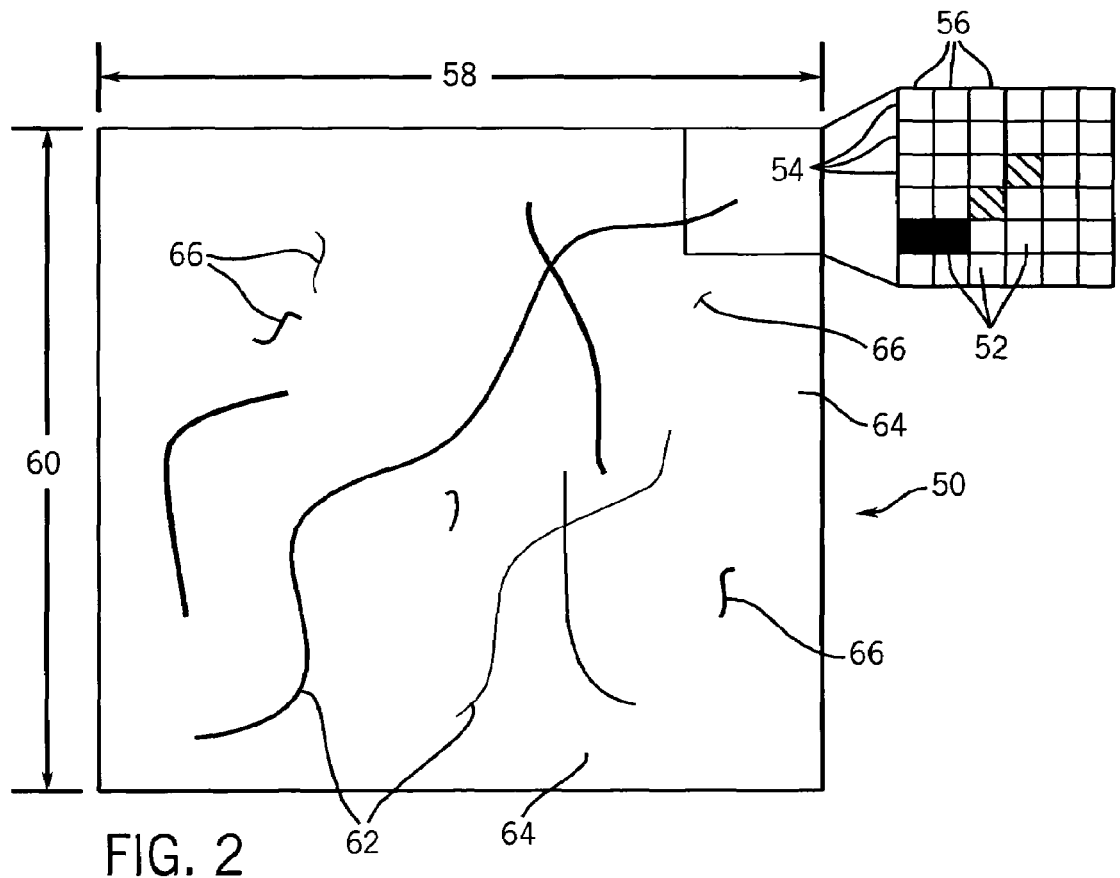
FIG. 2 is a diagram of an exemplary discrete pixel image made up of a matrix of pixels having varying intensities defining structures and non-structures to be enhanced by the present techniques.

FIG. 2 illustrates an exemplary discrete pixel image 50 produced via the imaging system 10. The image 50 is composed of a matrix of discrete pixels 52 disposed adjacent to one another in a series of rows 54 and columns 56. These rows and columns of pixels provide a pre-established matrix width 58 and matrix height 60. Typical matrix dimensions may include 256×256 pixels; 512×512 pixels; 1,024×1,024 pixels, to name just a few. In certain systems the particular image matrix size may be selected via input device 28 (see FIG. 1) and may vary depending upon such factors as the subject to be imaged the resolution desired and the physics or characteristics of the imaging system.

As illustrated in FIG. 2, the exemplary image 50 includes structural regions 62, illustrated as consisting of long, contiguous lines defined by adjacent pixels. The image 50 also includes non-structural regions 64 lying outside of the structural regions 62. The image 50 may also include isolated artifacts 66 of various sizes (i.e., number of adjacent pixels), which may be defined as structural regions, or which may be eliminated from the definition of structure in accordance with generally known techniques. It should be noted that while reference is made in the following discussion to intensity values within an image, such as the exemplary image 50, the present technique may also be used to process other parameters encoded for the individual pixels 52 of an image. Such parameters might include frequency or color, and not merely intensity.

In accordance with the present techniques, the acquired or processed image data forms what may be referred to as an input image. It should be understood that this input image, and other images referred to herein, are actually image data processed by the present techniques. The ultimate reconstructed image is, however, a visual presentation that can be viewed by a user. The present techniques allow for characterization of random point noise, which may be referred to in the present context as spike noise, such that this noise may be removed or reduced in the resulting reconstructive image along with patterned noise. Patterned noise reduction will typically be performed by the filtering circuitry described below. Such techniques do not, however, typically account for spike noise. By characterizing and accounting for such spike noise, the overall appearance and clarity of the resulting reconstructed images may be substantially enhanced.

Figure 3:
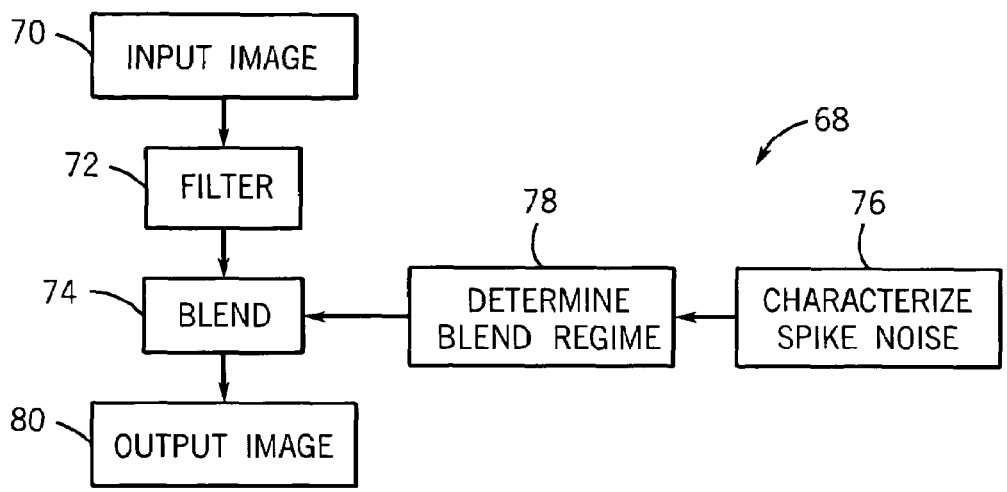
FIG. 3 is a diagrammatical representation of certain functional elements or components of a system for reducing spike noise in a digitized image in accordance with aspects of the present technique for use with a system and images of the type illustrated in the previous figures.

FIG. 3 represents a diagrammatical representation of a system for performing the functions of the present technique. The system, designated generally by reference numeral 68, may be implemented through hardware, software, firmware or a combination of these media. The system begins with an input image 70 produced by any suitable imaging system. The input image is typically stored on a digital storage device and is accessed by the processing system for enhancement and improvement of the image quality. The system includes a filter 72 which is typically embodied in appropriate software code stored in the system. Certain aspects of the filter may follow generally known techniques as described further below. Image data processed by filter 72 is blended with other processed data as indicated at block 74 in FIG. 3. In order to account for and reduce spike noise in the ultimate image, the spike noise in the input image characterized as indicated at reference numeral 76 in FIG. 3. The nature and function of the spike noise characterizing module 76 will be described in greater detail below. Once characterized, a separate module determines a blending regime for the spike noise data as indicated at reference numeral 78. This data is then blended with the filtered data at module 74. The resulting data, then, produces and output image 80 which includes data that can be reconstructed into an enhanced image for viewing, storing, transmitting, and subsequent processing.

Figure 4:
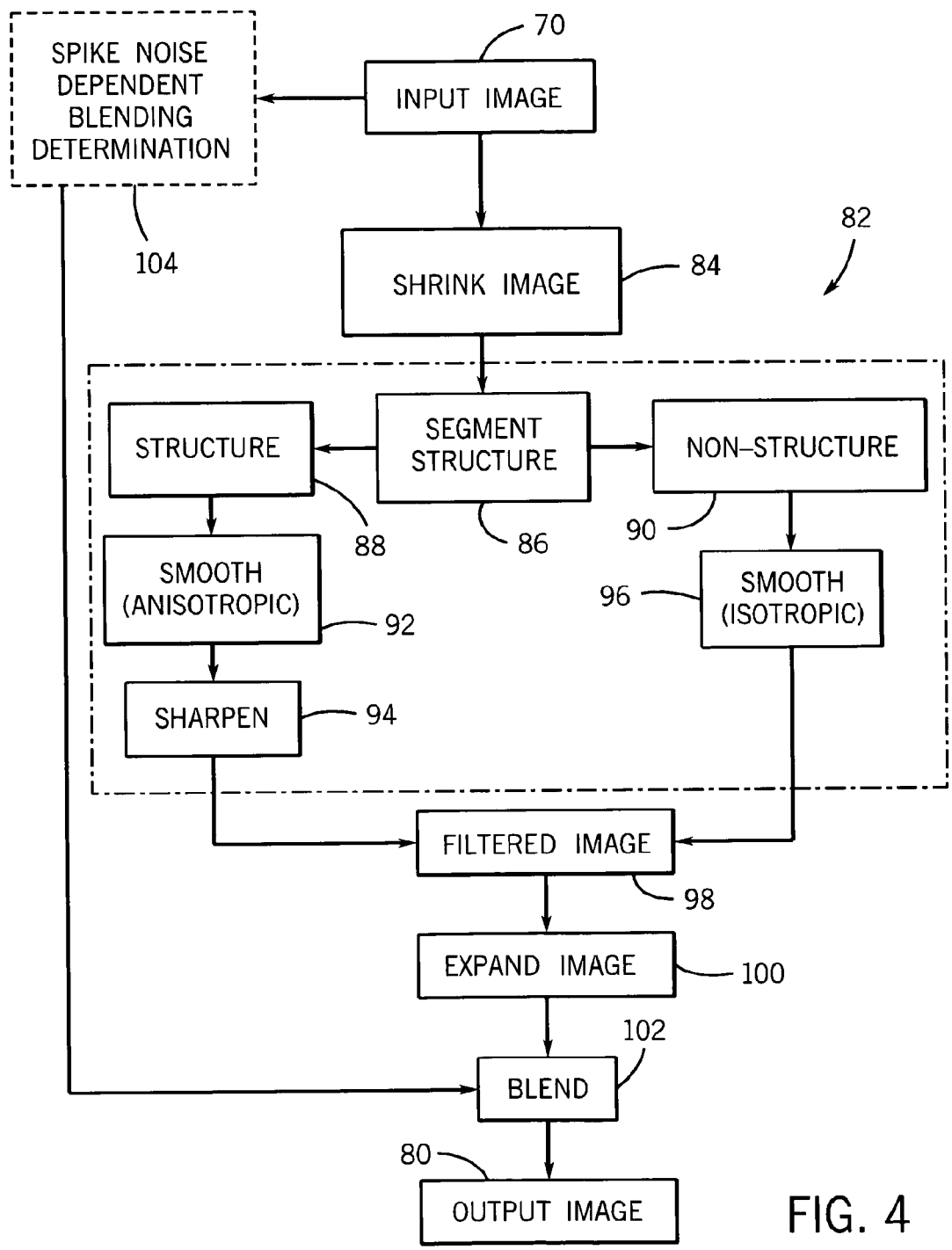
FIG. 4 is a more detailed representation of an implementation of the system of FIG. 3.

As noted, certain elements of the filter 72 may follow lines generally known in the art. FIG. 4 represents certain of these known elements, but with enhanced components incorporating the present techniques. The implementing system, designated generally by reference numeral 82, begins with the input image 70 as noted above. At a step 84 the system shrinks the input image, or sub-samples the input image by a shrink parameter. As will be appreciated by those skilled in the art, such shrinking may be accomplished by various sub-sampling techniques, including a pixel averaging, in which the digital values representative of intensities at each pixel are read and the image is shrunk by some factor X which is generally greater than 1. In a present embodiment, a 2×2 or 3×3 boxcar filter may be applied to obtain a non-overlapping average. Multi-dimensional factors may also be employed, such as 2×3 or 3×2 filters. A multi-dimensional factor must be greater than 1 in at least on of the dimensions, such as 3×1 or 1×3. To obtain non-overlapping averages, the pixels of the image may be mirrored at the boundaries when needed.

The filter 72 serves to identify and process structural features of the input image and non-structural features or regions. Thus, at block 86 of FIG. 4, routines are performed for identifying structures 88 within the normalized image, and differentiating such structures from non-structures 90. The structures are then processed by anisotropic smoothing as indicated at block 92, followed by sharpening, as indicated at block 94. The non-structure, on the other hand, is processed by isotropic smoothing, as indicated at block 96. The processed structure and non-structure then forms a filtered image, as indicated at reference numeral 98 in FIG. 4.

At block 100, the structure and non-structure data is expanded by the same factor by which the image was shrunk or sub-sampled at block 84. The resulting expansion produces an expanded structure mask and an expanded image, both of which have the same dimensions as the input image. At block 102, then, texture present in the input image is blended back into the expanded image to produce the output image 80. The blending process typically utilizes the expanded structure mask to allow differential texture blending of structure and non-structure regions.

It should be noted, and will be appreciated by those skilled in the art, that the exemplary steps and components of FIG. 4 are exemplary only. That is, other, different or additional modules and steps may be incorporated. By way of example, additional blending may occur in which high frequencies are differentially introduced into the blended image to produce a noise blended image. Certain of these techniques can further enhance image quality. The present techniques add to these and permit further enhancement of image quality as will be described.

The blending step as indicated at block 102 is, in accordance with the present technique, a spike noise dependent blending operation. That is, the input image 70 is provided to a routine, typically embodied in software, which processes the image data to make a spike noise dependent blending determination, as indicated at block 104 in FIG. 4. This determination may be made on several different bases, as indicated generally below. In one implementation, a mask of pixels that are likely to exhibit spike noise is generated and used to govern the blending at step 102. The mask may be a multi-level mask such that blending occurs at different weighting factors based upon the likelihood that pixels exhibit spike noise. Alternative approaches, also described below, facilitate processing, particularly where speed and computational efficiency are desired. Such techniques may be more suitable for rapid imaging systems, such as optical microscopy, fluoroscopy, and so forth.

The present technique makes use of the observation that random or spike noise points in an image are inconsistent with their neighbors while deterministic data points and structured noise points are consistent. Therefore, a properly chosen consistency metric should separate noise points from the remaining image data. Once identified, appropriately interpolated data points can replace noise points. In this context, appropriate interpolation refers to structure-dependent interpolation. Additionally, the structured noise is processed in accordance with the technique described above. The present techniques, then, provide a solution to synergistically mitigate both point and patterned noise in digital images.

As described in greater detail below, to identify random noise pixels in digital images, several approaches may be used. All of the approaches involve non-linear filtering. A class of such non-linear filtering is ranked-order filtering. In rank-order filtering, pixel values are arranged in an ascending or descending order, and a value between the extreme values is chosen as the filtered value. If the chosen value is in the middle of the ordered data, filtering may be referred to as median filtering. Median filtering is the most common example of rank-order filtering. Rank-order filtering has the advantage of excluding point processes and spikes in a digital signal without compromising edges even though both have high frequency content. Thus, a difference between the input image and the rank-order filtered image above a threshold will likely represent spike noise in the image data. This remarkable property of rank-order filtering is utilized in certain embodiments of the present techniques.

Figure 5:
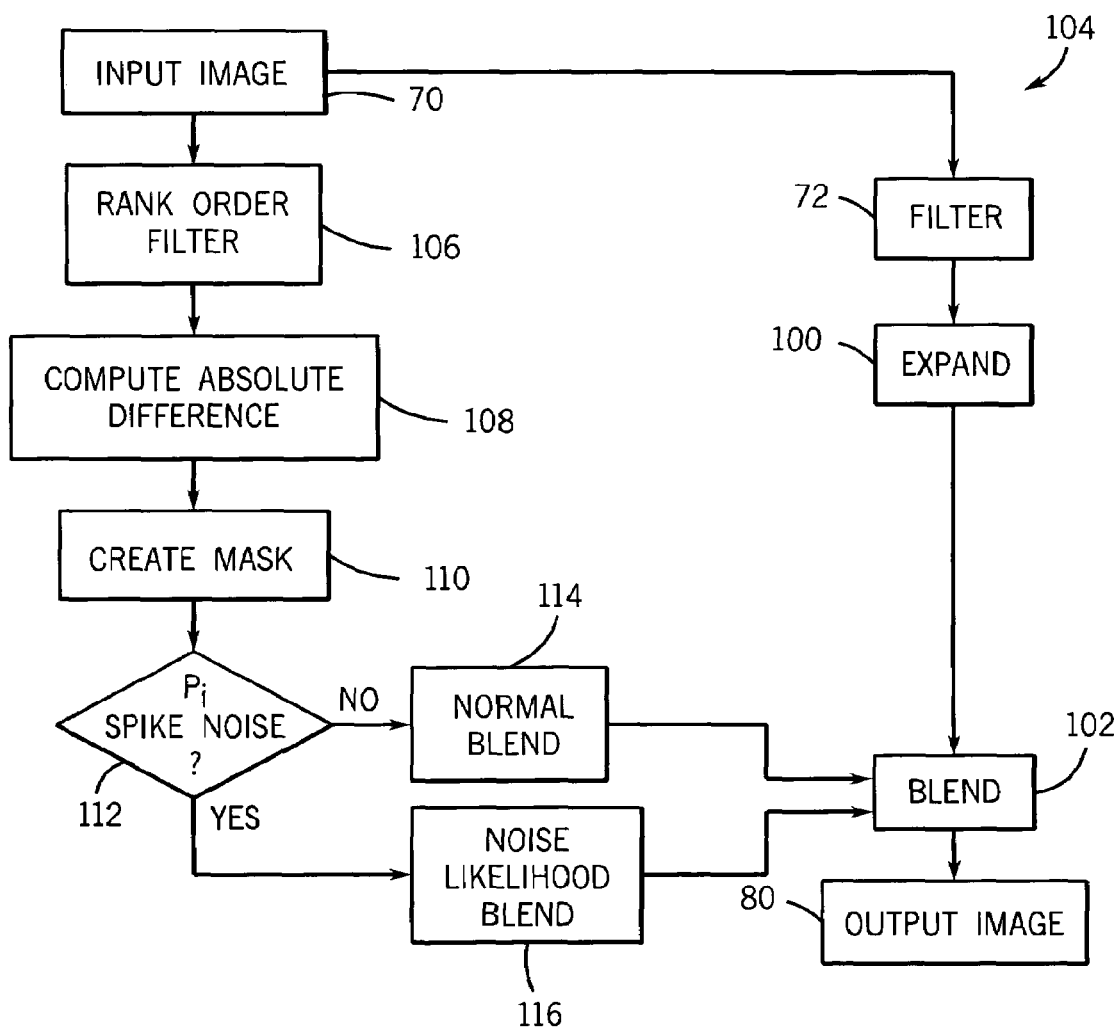
FIG. 5 is a flow chart illustrating exemplary steps in logic for characterizing and reducing spike noise in accordance with aspects of the present technique.

A process for characterizing spike noise for blending with filtered or processed image data is illustrated generally in FIG. 5 and designated by the reference numeral 104. The input image 70 is processed through filter 72 and later expanded at step 100 as described above. For characterization of spike noise, the input image is processed through a rank-order filter step 106. The extent of the rank-order filter may depend upon the definition of a spike for a particular image, imaging modality, and the like. For example, if spike noise is defined as a single pixel, then a 3×3 rank-order filtering kernel may suffice. As will be appreciated by those skilled in the art, for rank-order filtering each pixel of interest is replaced by a value selected from a rank-ordered listing of neighboring pixels. Thus, for a 3×3 kernel, 9 pixels, including the pixel of interest are rank-ordered and one of the values is selected to replace the pixel of interest value in the rank-ordered filtered image. Other kernel sizes may, of course, be utilized, such as conventional 7×7 kernels. In a present embodiment, the pixel of interest is replaced by a value near but necessarily in the middle of the range of neighboring pixel values. By way of example, the replacement pixel value may be on the order of the $40^{th}$ to $60^{th}$ percentile of the range of values.

At step 108, an absolute difference image is computed based upon the rank-order filtered image. The absolute difference image is computed by subtracting pixel values from the rank-order filtered image from correspondingly located pixel values in the input image. The absolute difference image will typically include relatively low values owing to the neighborhoods considered in the rank-ordering step performed.

At step 110 in FIG. 5, a spike noise-based mask is created having the same dimensions as the input image, the rank-order filtered image, and the absolute difference image. In this process, a histogram of the values contained in the absolute difference image is first compiled. A threshold intensity value on the histogram is selected based upon some criterion, such that it is more likely the spike noise differences are above this value. As noted above, this value may depend upon the particular image characteristics, the imaging modality, and so forth. By way of example, the threshold intensity value may be set to a value that is a percentage of counts of the first non-zero difference bin of the histogram.

By way of example, considering the histogram having the following bin values:

TABLE 1

| Difference | Frequency | |
|---|---|---|
| 0 | 302816 | |
| 1 | 98153 | N1 |
| 2 | 74414 | |
| 3 | 59586 | |
| 4 | 44514 | |
| 5 | 45072 | |
| 6 | 40623 | |
| 7 | 39682 | |
| . | . | |
| . | . | |
| . | . | |
| 15 | 12945 | |
| 16 | 11122 | |
| 17 | 9584 | Threshold |
| . | . | |
| . | . | |
| . | . | |

In the example of Table 1, the first non-zero difference bin of the histogram of the absolute difference image with a positive difference pixel count is bin #1, with 98153 counts. The threshold value may be set to a percentage of this count value, such as 10%. If the value is set to 10% of this first count value, the threshold will then fall at the $17^{th}$ bin, calculated by identifying the bin having a count nearest the value 9,815. In the example, bin 17 has a count of 9,584. Thus, in this example, all pixels with absolute differences of 17 or more are candidates for spike noise.

At step 110 in FIG. 5, then, a mask may be developed such that these pixels of the input image are tagged as spike noise. As described below, blending of the input image with the filtered and expanded image data may be governed, then, by this mask.

In addition to creating a binary mask of this type at step 110, it is presently contemplated that the spike noise mask may be a multi-level mask. To create such a mask, a multi-level threshold criterion may be used, such as to produce many levels of likelihood of spike noise. By way of example, six levels in the mask may be created by using difference percentage multipliers with the base account described above. For example, while the single value of 10% of the first bin count used above, multiple different levels may be used, and pixels falling at these multiple levels identified in the mask as relatively more or less likely to represent spike noise. The pixels at the various levels will then be associated with different blending parameters as described below.

At step 112 of FIG. 5, the processing circuitry determines whether each individual pixel of the image is likely to represent spike noise. As noted above, this likelihood may be based upon a binary mask or a multi-level mask. Where the pixel is not identified as likely to represent spike noise, normal blending with the expanded image may be performed as indicated at step 114. However, where the pixel is likely to represent spike noise, different blending may be performed as indicated at step 116.

In general, the blending performed at step 102 is based upon the relationship:

$$R = bF_i + (1-b)I_i$$

Where R represents the resulting image, F represents the filtered image (supplied following expansion at step 100 in FIG. 5), I represents the input image, and b represents a blending parameter. In general, the blending parameter may be between 1 and 0. As can be seen from this relationship, by manipulating the value of b, on a pixel-by-pixel basis, the resulting image, which will be the output image 80 in FIG. 5, includes a weighted blending of the input image with the filtered image.

Based upon the foregoing relationship, normal blending, which may use pre-selected or user-selected value for the weighting or blending parameter b, is performed when the pixel in questions is not identified as spike noise. Where the pixel is likely to represent spike noise, as represented by the spike noise mask, a different value for the blending parameter b is utilized, typically a smaller value to suppress spike noise.

Where a multi-level mask is used as described above, multiple blending parameters are employed for each level index. By way of example, if six separate levels are provided for the likelihood of a pixel representing spike noise, six respective of the blending parameter b are employed. It may be seen that the binary and multi-level masks are an extremely robust and simple approach to spike noise dependent blending. Where appropriate and possible, it may also be desirable to provide values for the blending parameter that result from a functional or mathematical relationship, so as to provide even greater levels of discrete blending based upon the likelihood that a pixel exhibits spike noise.

Figure 6:
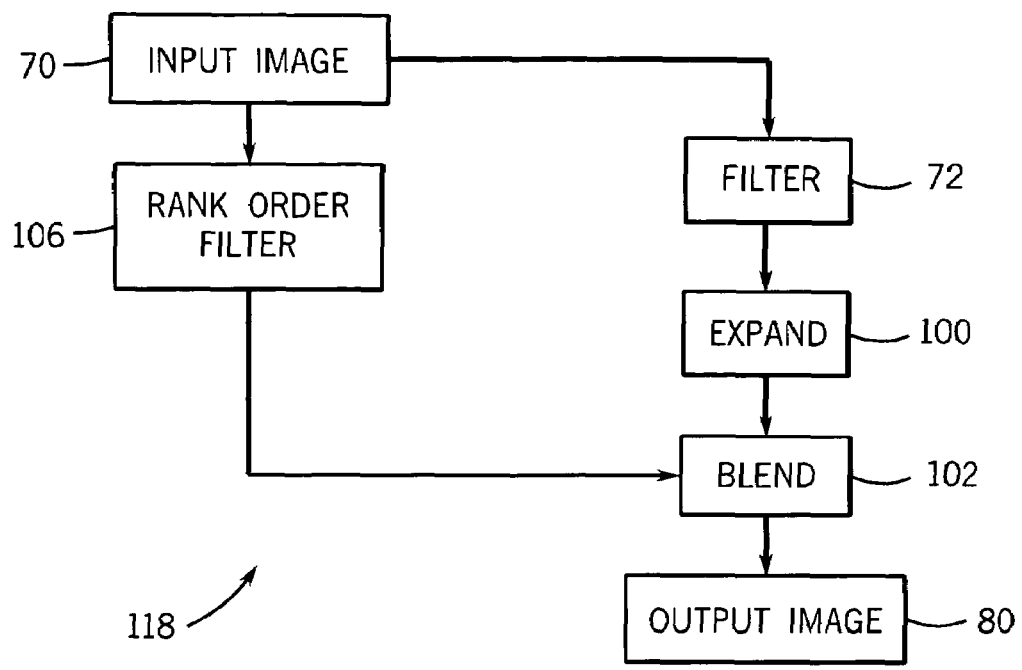
FIG. 6 is a flow chart illustrating exemplary logic in an alternative method for characterizing and reducing spike noise.

FIG. 6 illustrates a variant on the foregoing process, identified as prosess 118, which may be favored in situations where computational speed is desired. In this example, the input image is rank-order filtered at step 106 as before. However, in this example, the rank-order filtered values are used directly in the blending at step 102. A single blending parameter may be applied, then, with the relationship given above, although the input image values are replaced by the rank-order filtered value.

Figure 7:
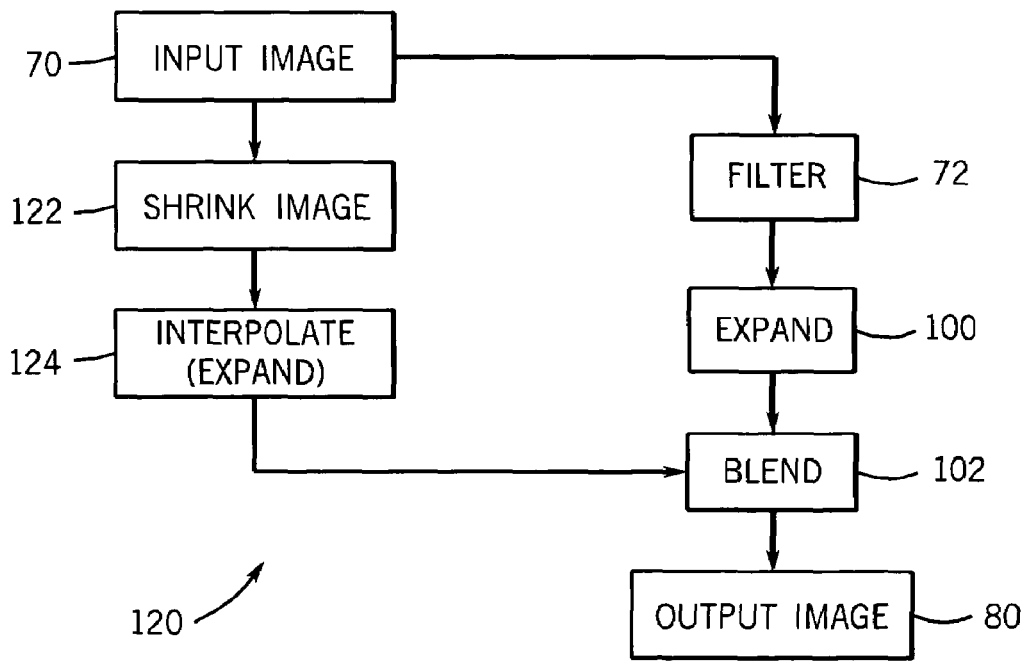
FIG. 7 is a flow chart illustrating exemplary logic in a further alternative procedure for characterizing and reducing spike noise.

FIG. 7 represents a further alternative process 120, also capable of rapid image processing. In this alternative, the input image 70 is shrunk by a predetermined amount at step 122. The shrinking process may be essentially a sub-sampling process of a type generally known in the art. Following step 122, then, the shrunk image is re-expanded by interpolation by the same factor as it had been shrunk, to provide an image of the same original dimensions. This shrinking and expanding will have a tendency to reduce spike noise. The expanded image may then be blended directly at step 102 as with the rank-order filtered image described with respect to FIG. 6.

All of the processes described above provide for characterization of spike noise, and blending based upon such characterization. It should also be noted that the procedures simultaneously accommodate and reduce spike noise and patterned noise. Although the method has been described with reference to two-dimensional images, it may be readily applied to one-dimensional signals and to three-dimensional images and data. The method is applicable in the acquisition domain to counter electronic or photonic noise, consisting of spikes. By way of example, the spike noise reduction technique described herein is more suited to raw k-space data in MR imaging than to reconstructed image data where most spike noise is blurred by the global lowpass filtering that also reduces the resolution of the reconstructed image. As another example, the method is applicable to Radon space data in CT imaging where currently high frequency content is removed prior to reconstruction. In yet another example, the method is applicable to MR spectroscopy data to derive spike noise-free data. Furthermore, the method is applicable to ultrasound images prior to distance-dependent interpolation (r-theta conversion). As noted above, there are also non-diagnostic imaging applications for the present technique. Such applications may include, but are certainly not limited to, optical microscopy, where a single frame in fluorescent imaging can be processed and made equivalent to an eight-frame averaged image. Even more generally, the method is applicable to any signal or image where spike noise alone or with patterned noise is beneficially removed or reduced.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for processing image data comprising:
    processing input image data by identifying features of interest to produce processed image data;
    characterizing spike noise in the input image data; and
    performing spike noise dependent blending of data derived from the input image data with the processed image data based upon the characterization.

2. The method of claim 1, wherein the spike noise is characterized by rank-order filtering the input image data.

3. The method of claim 2, wherein the spike noise is characterized by computing an absolute difference between the rank-order filtered input image data and the input image data.

4. The method of claim 3, wherein the spike noise is characterized by generating a multi-level mask of spike noise likelihood based upon the absolute differences.

5. The method of claim 2, wherein the rank-order filtered input image data is blended with the processed image data.

6. The method of claim 1, wherein blending via a first weighting factor is performed on discrete picture elements determined not to exhibit spike noise, and blending via at least one second weighting factor is performed on discrete picture elements determined to exhibit spike noise.

7. The method of claim 1, wherein the data derived from the input image data is determined by shrinking an input image by a desired factor and interpolating the resulting image to the size of the input image.

8. A method for processing image data comprising:
    processing input image data by identifying features of interest to produce processed image data;
    characterizing spike noise in the input image data by rank-order filtering the input image data, computing an absolute difference between the rank-order filtered input image data and the input image data, and generating a multi-level mask of spike noise likelihood based upon the absolute differences; and
    performing spike noise dependent blending of input image data with the processed image data based upon the multi-level mask.

9. The method of claim 8, wherein the multi-level mask encodes weighting factors for blending of data corresponding to discrete picture elements.

10. The method of claim 8, wherein the features of interest include structural regions defined by the input image data.

11. A method for processing image data comprising:
    processing input image data by identifying features of interest to produce processed image data;
    determining a likelihood that discrete picture elements in the input image data exhibit spike noise; and
    blending data derived from the input image data with the processed image data via weighting factors determined based upon the likelihood that the discrete picture elements exhibit spike noise.

12. The method of claim 11, wherein the likelihood is determined by rank-order filtering the input image data.

13. The method of claim 12, wherein the likelihood is determined by computing an absolute difference between the rank-order filtered input image data and the input image data.

14. The method of claim 13, wherein the likelihood is determined by generating a multi-level mask of spike noise likelihood based upon the absolute differences.

15. The method of claim 12, wherein the rank-order filtered input image data is blended with the processed image data.

16. The method of claim 11, wherein blending via a first weighting factor is performed on discrete picture elements determined not to exhibit spike noise, and blending via at least one second weighting factor is performed on discrete picture elements determined to exhibit spike noise.

17. The method of claim 11, wherein the data derived from the input image data is determined by shrinking an input image by a desired factor and interpolating the resulting image to the size of the input image.

18. A system for processing image data comprising:
    a memory circuit for storing input image data;
    a processing module for processing the input image data to generate processed image data; and
    a spike noise blending module configured to determine a likelihood that discrete picture elements in the input image data exhibit spike noise, and to blend data derived from the input image data with the processed image data via weighting factors determined based upon the likelihood that the discrete picture elements exhibit spike noise.

19. The system of claim 18, wherein the processing module and the blending module are defined by computer code in an appropriately programmed computer system.

20. The system of claim 18, further comprising an image acquisition system for generating the input image data.

21. A system for processing image data comprising:
    means for processing input image data by identifying features of interest to produce processed image data;
    means for characterizing spike noise in the input image data; and
    means for performing spike noise dependent blending of data derived from the input image data with the processed image data based upon the characterization.

22. A system for processing image data comprising:
    means for processing input image data by identifying features of interest to produce processed image data;
    means for characterizing spike noise in the input image data by rank-order filtering the input image data, computing an absolute difference between the rank-order filtered input image data and the input image data, and generating a multi-level mask of spike noise likelihood based upon the absolute differences; and
    means for performing spike noise dependent blending of input image data with the processed image data based upon the multi-level mask.

23. A system for processing image data comprising:
    means for processing input image data by identifying features of interest to produce processed image data;
    means for determining a likelihood that discrete picture elements in the input image data exhibit spike noise; and
    means for blending data derived from the input image data with the processed image data via weighting factors determined based upon the likelihood that the discrete picture elements exhibit spike noise.

24. One or more computer readable mediums encoded with a computer program comprising:
    a routine for processing input image data by identifying features of interest to produce processed image data;

a routine for characterizing spike noise in the input image data; and a routine for performing spike noise dependent blending of data derived from the input image data with the processed image data based upon the characterization.

25. One or more computer readable mediums encoded with a computer program comprising:
- a routine for processing input image data by identifying features of interest to produce processed image data;
- a routine for characterizing spike noise in the input image data by rank-order filtering the input image data;
- a routine for computing an absolute difference between the rank-order filtered input image data and the input image data;
- a routine for generating a multi-level mask of spike noise likelihood based upon the absolute differences; and
- a routine for performing spike noise dependent blending of input image data with the processed image data based upon the multi-level mask.

26. One or more computer readable mediums encoded with a computer program for processing image data, the computer program comprising:
- a routine for processing input image data by identifying features of interest to produce processed image data;
- a routine for determining a likelihood that discrete picture elements in the input image data exhibit spike noise; and
- a routine for blending data derived from the input image data with the processed image data via weighting factors determined based upon the likelihood that the discrete picture elements exhibit spike noise.

* * * * *

UNITED STATES PATENT AND TRADEMARK OFFICE
CERTIFICATE OF CORRECTION

PATENT NO.       : 7,623,723 B2                          Page 1 of 1
APPLICATION NO.  : 10/723736
DATED            : November 24, 2009
INVENTOR(S)      : Gopal B. Avinash It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1763 days.

Signed and Sealed this

Twenty-sixth Day of October, 2010

David J. Kappos
*Director of the United States Patent and Trademark Office*